United States Patent [19]

Dierker, Jr. et al.

[11] Patent Number: 4,862,025
[45] Date of Patent: Aug. 29, 1989

[54] DUAL SPEED SENSOR PICKUP ASSEMBLY

[75] Inventors: Joseph B. Dierker, Jr., Southfield; Glen D. Peterson, Battle Creek; Thomas A. Gee, Allen Park, all of Mich.

[73] Assignee: Eaton Corporation, Cleveland, Ohio

[21] Appl. No.: 236,570

[22] Filed: Aug. 25, 1988

[51] Int. Cl.$^4$ .................. G01L 3/14; B60K 23/04; B60L 3/10; H02K 11/00
[52] U.S. Cl. .................. 310/68 B; 74/710.5; 310/114; 310/168; 324/174
[58] Field of Search .......... 73/493; 74/710.5, 711, 74/713; 310/68 B, 83, 114, 118, 155, 168; 324/173, 174, 225

[56] References Cited

U.S. PATENT DOCUMENTS

| | | | |
|---|---|---|---|
| 3,469,662 | 9/1969 | Dewar | 324/174 |
| 3,504,538 | 4/1970 | Andrews et al. | 310/168 |
| 3,719,841 | 3/1973 | Ritsema | 324/174 |
| 3,769,533 | 10/1973 | Pauwels | 310/155 |
| 3,961,214 | 6/1976 | Lokkart | 310/155 |
| 4,225,019 | 9/1980 | Blomberg | 310/168 |
| 4,373,147 | 2/1983 | Carlson, Jr. | 310/114 |
| 4,492,906 | 1/1985 | Goto et al. | 310/68 B |
| 4,724,935 | 2/1988 | Roper et al. | 73/493 |
| 4,790,404 | 12/1988 | Naito | 74/710.5 |

Primary Examiner—Patrick R. Salce
Assistant Examiner—D. L. Rebsch
Attorney, Agent, or Firm—H. D. Gordon

[57] ABSTRACT

A dual speed sensor pickup assembly (140) for sensing the rotational velocity of two independently rotatable, closely axially spaced exciter rotors (116 and 118) includes two pole piece assemblies (136 and 138) having axes skewed relative to one another, but radial relative to the common axes of rotation (24) of the exciter rotors. Applications include drive axles and antilock brakes.

17 Claims, 4 Drawing Sheets

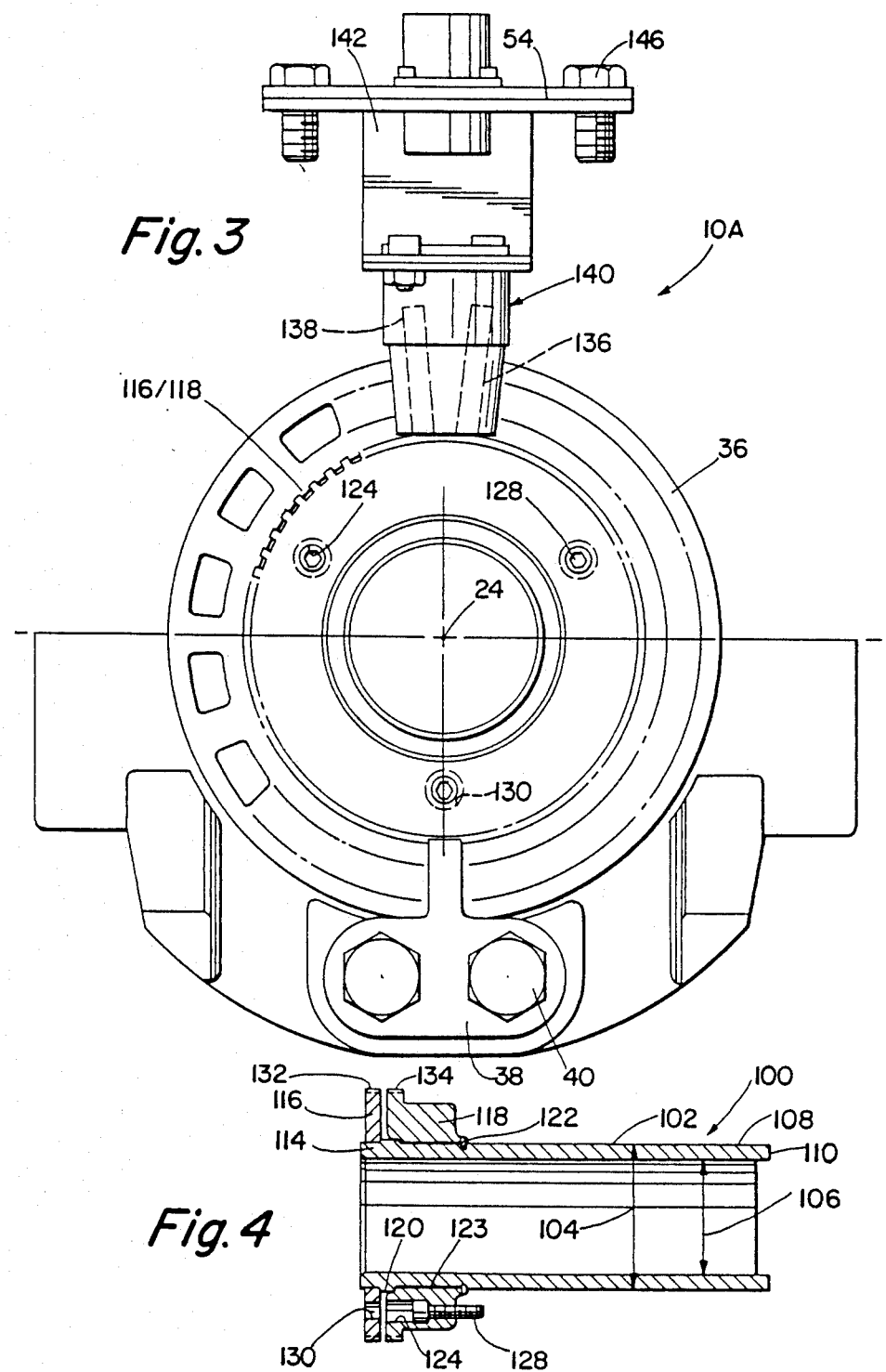

DUAL SPEED SENSOR PICKUP ASSEMBLY

RELATED APPLICATIONS

This application is related to U.S. patent application Ser. No. 236,569, title EXCITER ROTOR ASSEMBLY, filed the same day and assigned to the same assignee as this application.

BACKGROUND OF THE INVENTION

1. Field of the Invention

The present invention relates to a speed sensor assembly for drive axles. In particular, the present invention relates to a speed sensor assembly mounted to the differential head portion of a drive axle housing for sensing the rotational speed of the driven ring gear and of one of the differential side gears. More particularly, the present invention relates to a dual speed sensor pickup assembly for a speed sensor assembly of the general type described above which is assembled to and removed from the drive axle assembly as a unitary preassembled subassembly.

2. Description of the Prior Art

ABS or anti-lock brake systems are well known in the prior art as may be seen by reference to U.S. Pat. Nos. 3,604,760; 3,719,841; 3,767,270; 3,854,556; 3,995,912; 3,929,382 and 3,929,383, the disclosures of all of which are hereby incorporated by reference. Briefly, these systems utilize speed sensors, usually a separate sensor assembly at each of the axle ends of each monitored vehicle axle, to sense individual or average rotational wheel speed and to provide signals indicative thereof. Logic means are utilized to receive and process the signals in accordance with predetermined logic rules to determine if an impending or actual wheel-lock condition exists and to issue command output signals to modify the braking force applied to monitored and/or controlled brake sites.

Simplifying such systems by utilizing a single sensor mounted in a relatively protected location within the drive axle housing for sensing the rotational speed of the differential gearing which will provide an average wheel speed signal, is also known in the prior art as may be seen by reference to U.S. Pat. Nos. 3,719,841 and 4,724,935, the disclosures of which are incorporated by reference.

The use of an in-axle wheel speed sensor assembly mounted in the drive axle housing adjacent the differential gearing for sensing an average wheel speed value and an individual wheel speed value (from which both wheel speed values may be calculated) is known in the prior art as may be seen by reference to U.S. Pat. No. 3,769,533, the disclosure of which is incorporated by reference.

While the prior art in-axle speed sensor assemblies are improvements over sensor assemblies mounted at the wheel ends as the sensors and exciters are located at a more protected location and the signals are required to travel a shorter distance and thus be less subject to damage and/or electromagnetic interference, such assemblies were not totally satisfactory as only an average wheel speed was sensed, mounting of the exciter rotors to the gearing required considerable time and/or modification of the existing gearing and/or cross-talk interference between two closely spaced sensor pickups was not minimized.

SUMMARY OF THE INVENTION

In accordance with the present invention, the drawbacks of the prior art have been minimized by the provision of a dual, in-axle speed sensor assembly for sensing the rotational speeds of the ring gear and of one of the differential side gears, which is quickly and easily mounted to the existing axle gearing with only a minimum of modification thereto and which minimizes electromagnetic cross-talk interference between the closely spaced sensors. The speed sensor assembly comprises an exciter rotor assembly and the dual pickup assembly of the present invention.

Preferably, the exciter rotor assembly is a preassembled subassembly having a first exciter rotor mountable for rotation with the ring gear or a member, such as a carrier, rotatable with the ring gear and a coaxial closely axially spaced second exciter rotor mountable for rotation with one of the side gears. The exciter rotor assembly includes an elongated tubular portion having the second exciter rotor fixed at one end thereof. The first exciter rotor is axially fixed to the tubular portion and just inboard of the second rotor and is carried for independent rotation. The other end of the tubular portion carries a plurality of teeth or slots for axial engagement with complimentary slots or teeth provided in the one side gear. The first rotor has a plurality of equally spaced bores corresponding with tapped bores provided in an outwardly facing surface of the carrier for receipt of mounting bolts by which the first rotor is fixed for rotation with the ring gear/carrier and the exciter rotor assembly is fixed to the drive axle.

A dual speed sensor pickup assembly comprising a pair of separate pole pieces, one for each exciter rotor, is mountable to the axle housing with the pole pieces axially aligned with the rotors. The pole pieces are skewed with respect to one another, but extend radially relative to the exciter rotors, to minimize possible electromagnetic cross-talk interference therebetween.

Accordingly, it is an object of the present invention to provide a dual pickup assembly for two closely axially spaced independently rotatable rotors which will have a minimum of electromagnetic cross-talk interference therebetween.

This and other objects and advantages of the present invention will become apparent from a reading of the detailed description of the preferred embodiment taken in view of the drawings.

BRIEF DESCRIPTION OF THE DRAWINGS

FIG. 3 is a partial sectional view taken along the lines 3—3 in FIG. 2.

FIG. 4 is an enlarged elevational view of the exciter rotor assembly.

DESCRIPTION OF THE PREFERRED EMBODIMENT

Figure 1:
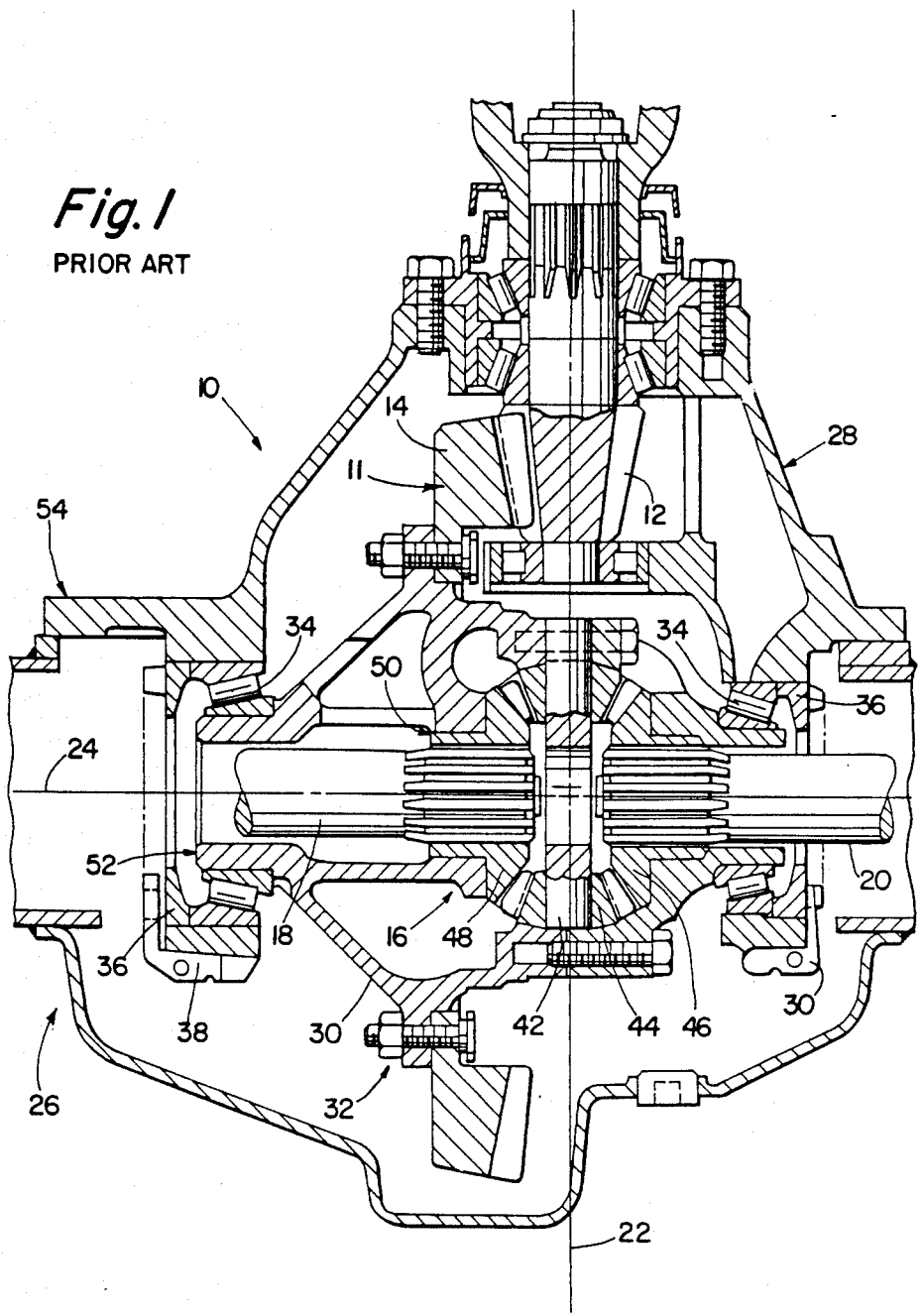
FIG. 1 is a partial sectional view of a typical prior art heavy-duty drive axle of the type to which the exciter rotor assembly of the present invention is utilized.

In the following description of the present invention, certain terms will be utilized for purposes of reference only and are not intended to be limiting. The terms "upward", "downward", "rightward" and "leftward" refer to directions in the drawings to which reference is made. The words "inward" and "outward", respectively, refer to directions towards and away from, respectively, the geometric center of the device described. Said terminology will include the words above specifically mentioned, derivatives thereof and words of similar import.

Heavy-duty drive axles utilizing ring gear/pinion gear right angle gear-sets are well known in the prior art. Referring to FIG. 1, a single reduction drive axle 10 utilizing such a gear-set 11 comprising a pinion gear 12 meshingly engaged with a ring gear 14 is illustrated. A differential assembly 16 is fixed to the ring gear for driving the two axle shafts 18 and 20. Axle shafts 18 and 20 drive the left and righthand, respectively, drive wheels (not shown) as is well known in the prior art. The axis of rotation 22 of the pinion gear 14 is substantially perpendicular to the axis of rotation 24 of ring gear 14 (and the differential 16 and axle shaft 18 and 20). Heavy-duty drive axles of this, and of the two-speed planetary double reduction type, are well known in the prior art.

The drive axle assembly includes an axle housing 26 having a differential head portion 28. The ring gear 14 is mounted for rotation with a differential carrier 30 by means of bolt and nut assemblies 32. The differential carrier is rotationally supported in the housing portion 28 by means of taper bearings 32 which are adjustably positioned by bearing adjusters 36 which are maintained in position by bearing adjuster lock members 38, and bolts 40.

The differential carrier 30 carries the differential spider member 42 on which are rotatably received the differential pinion gears 44. The differential pinion gears are constantly meshed with a righthand and lefthand side gear, 46 and 48, respectively, which side gears are rotatably engaged by the drive shafts 20 and 18 by means of a splined connection as is well known in the prior art. As is also well known in the prior art, the rotational speed of ring gear 14, and differential carrier 30 which rotates therewith, is equal to the average speed of the side gears 46 and 48. Accordingly, if the rotational speed of any two of ring gear 14, side gear 46 and side gear 48 is known, the rotational speed of the other of the gears may be easily determined. Further details may be seen by reference to above-mentioned U.S. Pat. No. 3,769,533.

To utilize the exciter rotor assembly with a standard drive axle of the type illustrated in FIG. 1, only the leftwardly facing axial surface 50 of side gear 48, a leftwardly facing axial surface 52 of the carrier 30 and possibly surface 54 of the housing portion 28 require modification as will be described in detail below.

Figure 2:
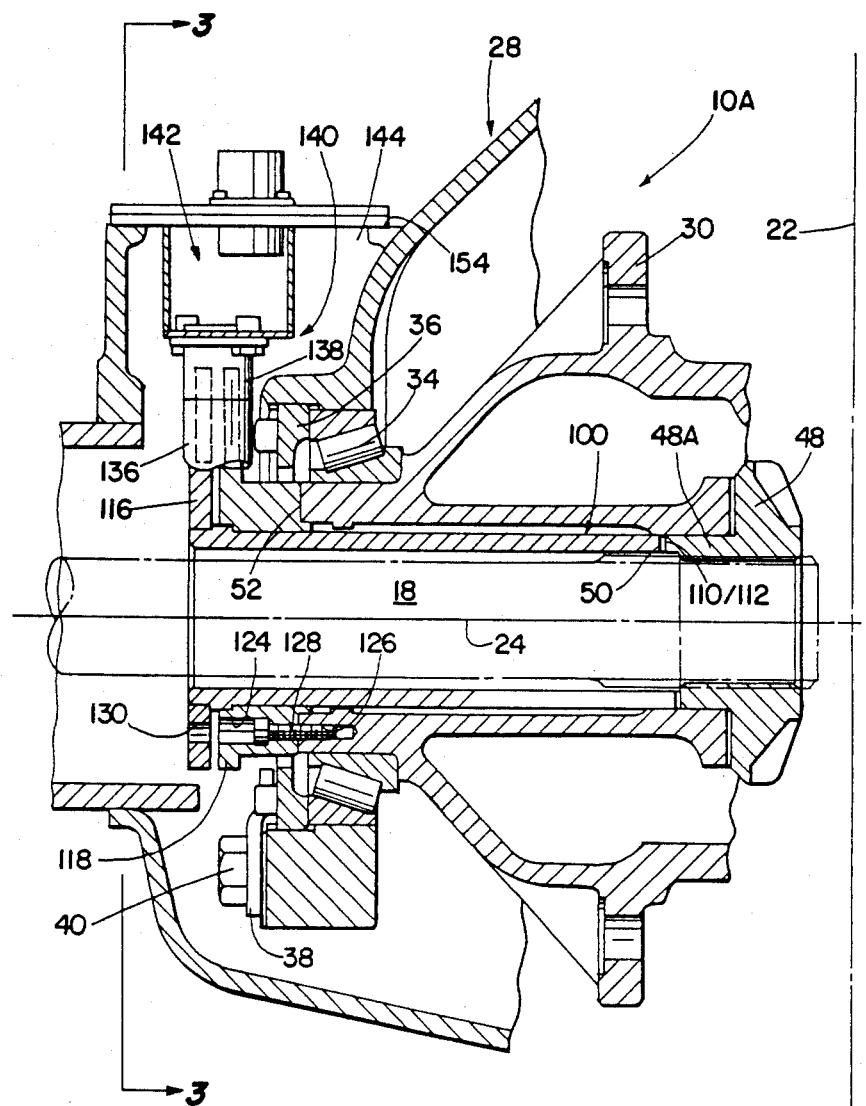
FIG. 2 is a partial sectional view of a drive axle assembly similar to FIG. 1 in which the exciter rotor assembly and the dual speed sensor pickup assembly of the present invention have been mounted.

The exciter rotor assembly 100 may be seen by reference to FIG. 4 and as installed in a drive axle 10a, substantially identical to drive axle 10 described in FIG. 1 above, and by reference to FIGS. 2 and 3.

Exciter rotor assembly 100 includes a generally tubular member 102 having an outer diameter 104 generally equal to the outer diameter of the hubbed portion 48a of side gear 48 and an inner diameter 106 slightly greater than the outer diameter of axial shaft 18, allowing the axle shaft 18 to be received within the tubular portion 102. At its rightward or inboard end 108 the tubular portion is provided with a pair of axially inwardly extending projections or teeth 110 which are engagable with axially extending slots 112 opening to the surface 50 of the hub portion 48a of side gear 48. Engagement of the projection teeth 110 in the slots 112 will, of course, rotationally couple the tube 102 to the side gear 48. At its leftward or outboard end 114, the tubular portion carries an exciter rotor 116 fixed thereto as by welding or the like. Exciter rotor 116 will, accordingly, rotate with side gear 48, axle shaft 18 and the wheel end driven thereby wherein the teeth 110 and slots 112 are interengaged.

Another exciter rotor 118 is rotatably carried by tubular member 102 immediately axially adjacent exciter rotor 116. Preferably, exciter rotor 118 is axially positioned on the tubular member 102 between a shoulder portion 120 separating the two exciter rotors and a snap-ring 122. An anti-friction bushing or bearing 123 may be utilized to support rotor 118 on tubular member 102. Exciter rotor 118 is provided with a plurality of through bores 124 generally equally circumferentially spaced about the rotor. The leftwardly axially facing surface 52 of carrier 30 is provided with a complementary set of tapped blind bores 126 for threaded receipt of bolts or cap screws 128 by which the exciter rotor 118 is rotationally fixed to the differential carrier 30 and the assembly 100 is axially retained within the drive axle 10a. The rotor 116 is provided with one or more through bores 130 on a bolt circle having the same diameter as bores 124 and 126 allowing access to the bolts or cap screws 128 by a screwdriver, allen wrench, or the like. Accordingly, by modifying axle 10a, relative to standard axle 10, only by providing slots 112 in surface 50 of the side gear hub 48a and internally threaded bores 126 in surface 52 of the differential carrier 30, the exciter rotor assembly 100 may be easily assembled to the drive axle by means of three cap screws or bolts 128 which are threadably received in or removed from the threaded bores 126 from the exterior of the drive axle through the axial bore 130 provided in rotor 116. Preferably, the cap screws 128 have larger heads than the bore 130 to capture the cap screws in the exciter assembly.

As may be seen by reference to FIG. 2, the inner end 108 of tubular member 102 is piloted in the same bore in carrier 30 that side gear 48 is piloted in, to minimize runout of of the tubular member 102, and of rotors 116 and 118, relative to axis of rotation 24.

Exciter rotor 116 and 118, respectively, are provided with teeth 132 and 134, respectively, which will rotate past the axially spaced electromagnetic sensor pole members 136 and 138, respectively, which are contained in the dual speed sensor pickup assembly 140. Preferably to minimize electromagnetic interference, the central processing unit, or CPU, for processing the input signals from pickups 136 or 138, 142 is integral with or attached directly to the pickup assembly 140. The speed sensor pickup assembly 140 and CPU 142 are mounted at an opening 144 provided in surface 54 of the housing 26. Preferably, opening 144 may be the opening commonly utilized with two speed axle actuators and/or differential lockup actuators of the types illustrated in U.S. Pat. Nos. 3,503,280; 3,502,177 and 3,358,517, the disclosures of all of which are hereby incorporated by reference. Alternatively, opening 144 may be provided in surface 54 as well as two threaded blind bores for receipt of mounting bolts 146.

The operation, structure and function of electromagnetic speed sensor assemblies comprising an exciter rotor and a pickup or stator member is well known in the prior art as may be seen by reference to U.S. Pat. Nos. 3,854,556; 3,938,112; 3,961,215; 3,988,624 and 3,961,214, the disclosures of all of which are hereby incorporated by reference.

Briefly, in a typical electromagnetic speed sensor assembly, rotation of the exciter rotor past the pickup member will induce an electromagnetic current or potential having pulses or a frequency proportional to the relative rotational speed of the rotor.

Figure 5A:
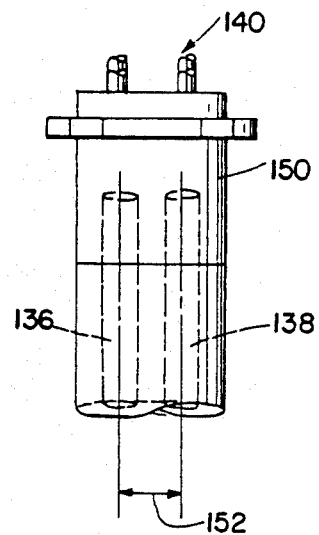
FIGS. 5A, 5B, 5C and 5D are front, side, top and prospective views, respectively, of the speed sensor pickup assembly of the present invention.
Figure 5B:
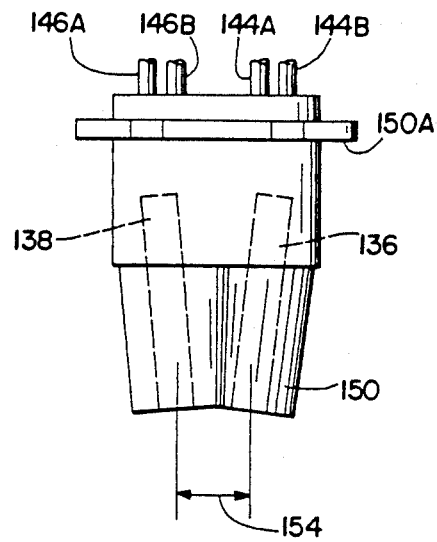
Figure 5C:
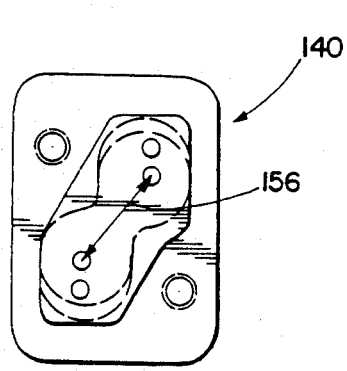

To minimize the possibility of electromagnetic cross-talk interference between the two independent pole pieces 136 and 138, the pole pieces are circumferentially offset from one another as may be seen in FIG. 5C and are skewed relative to one another as may be seen by reference to FIG. 5B. Briefly, as may be seen by reference to FIG. 5B, each of the pole pieces are skewed about six degrees (6°) relative to vertical in opposite directions and thus are skewed by an angle of approximately twelve degrees (12°) relative to one another. However, the axes of the pole pieces are radial relative to the axis of rotation of the exciter rotors 116 and 118. It has been found that by utilizing the sensor assembly structure described above, even if utilizing two relatively closely axially spaced sensors, electromagnetic cross-talk between the two independent sensors is minimized to an acceptable level.

Figure 5D:
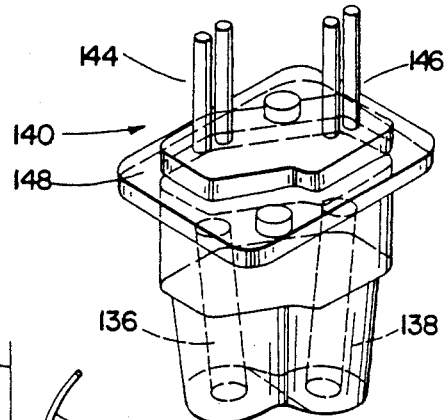

The dual speed sensor pickup assembly 140 may be seen in a perspective view in FIG. 5d.

The sensor pickup assembly 140 comprises the two pole pieces which are preferably of a permanent magnet material, around each of which is wrapped a coil of wire 144 and 146, respectively, the opposite ends of each of which coils, 144a and 144b and 146a and 146b, respectively, extend from the assembly 140. The pickup assembly also includes a mounting plate 148 and a block of epoxy resin 150 in which the pole pieces and coils are encapsulated by being potted or molded. Measured in a direction parallel to axis 24, the pole pieces are separated by an axial distance 152 generally equal to the axial separation of the exciter rotor teeth 132 and 134 of exciter rotors 116 and 118 on exciter rotor assembly 100. However, as the pole pieces are circumferentially offset, the ends of the pole pieces, when measured in a direction perpendicular to axes 24 and 22 (see FIG. 5B) are separated by a distance 154 which exceeds distance 152. The actual separation of the inner ends of the pole oieces 156, as may best be seen by reference to FIG. 5C is maximized by circumferentially offsetting the pole pieces to the extent possible within the block of epoxy 150. By maximizing the separation of the pole pieces, and by orienting the pole pieces on skewed axes relative to one another while retaining the axes radial to the axis of rotation of the exciter rotors, which minimizes the average radial gap for a given minimal radial gap between the rotor and pick up, the accuracy of the speed sensor pickups is maximized while the tendency for electromagnetic cross-talk interference is minimized.

Figure 6:
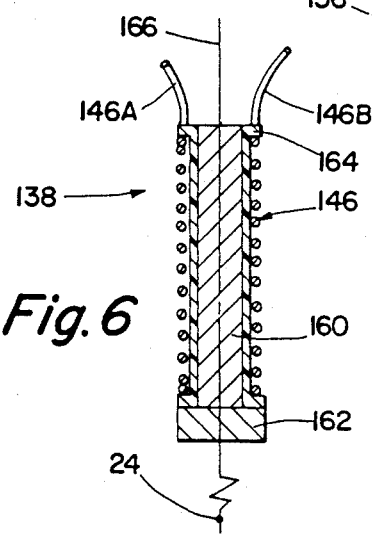
FIG. 6 is an enlarged sectional view of a pole piece member utilized in the dual speed sensor pick-up assembly of the present invention.

A somewhat schematic illustration of one of the pole piece assemblies may be seen by reference to FIG. 6. Briefly, each of pole piece assemblies, such as assembly 138 comprises a pole member 160 which is a cylindrical piece of ferromagnetic material, such as iron or steel. Fixed to the bottom end of the pole member 160 is a generally disk shaped permanent magnet 162. A nylon bobbin 164 slips over the pole member 160 and carries the coil 146. The pole member 160 defines an axis 166 which is maintained substantially radial relative to axis of rotation 24 of exciter rotor 116.

Accordingly, it may be seen, that a dual speed sensor assembly comprising exciter rotor subassembly and a pickup subassembly which are easily mounted to a relatively standard axle, which require relatively minor modification of the parts of a relatively standard axle and which minimize the tendency for electromagnetic cross-talk interference between the two separate sensors has been provided by the present invention.

Although the present invention has been described with a certain degree of particularity, it is understood that various modifications and rearrangements of the parts thereof are possible without departing from the spirit and the scope of the invention as hereinafter claimed.

We claim:

1. A dual speed sensor pickup assembly (140) for sensing the rotational velocity of a first (116) and a second (118) exciter rotor, said exciter rotors closely axially spaced and independently rotatable about a common axis of rotation (24), said pickup assembly comprising mounting means (150/150a) for mounting said pickup assembly in predetermined position relative to said first and second exciter rotors, a first (136) and a second (138) pole piece assembly fixedly retained in said mounting means, each of said pole piece assemblies comprising a ferromagnetic pole piece (160), a permanent magnet (162) and a conductive coil (146) surrounding the pole piece, said coil and pole pieces each defining a longitudinally extending axis (166) about which the coil is looped, said pickup assembly characterized by:

said first and second pole piece assemblies being oriented within said mounting means such that said longitudinal axes thereof are each radial with respect to the common axis of rotation of said rotors, but are skewed relative to one another.

2. The pickup assembly of claim 1 wherein the longitudinal axes of said first and second pole pieces define and include an angle therebetween of about twelve degrees (12°) on a projection (FIG. 3) on a plane perpendicular to said axis of rotation.

3. The pickup assembly of claim 2 wherein said included angle is in the range of six degrees (6°) to twenty degrees (20°).

4. The pickup assembly of claim 1 wherein said mounting means defines a substantially rectangular cross-section on a projection on a plane perpendicular to a line radial to said axis of rotation (FIG. 5C), said longitudinal axes each being on planes substantially perpendicular to said axis of rotation.

5. The pickup assembly of claim 2 wherein said mounting means defines a substantially rectangular cross-section on a projection on a plane perpendicular to a line radial to said axis of rotation (FIG. 5C), said longitudinal axes each being substantially on planes substantially perpendicular to said axis of rotation.

6. The pickup assembly of claim 1 wherein said mounting means includes a block of substantially non-magnetically conductive material in which said first and second pole pieces are encapsulated.

7. The pickup assembly of claim 2 wherein said mounting means includes a block of substantially non-magnetically conductive material in which said first and second pole pieces are encapsulated.

8. The pickup assembly of claim 4 wherein said mounting means includes a block of substantially non-magnetically conductive material in which said first and second pole pieces are encapsulated.

9. A drive axle assembly (10a) including in-axle exciter rotor assembly (100) comprising a first (116) and a second (118) exciter rotor and a dual speed sensor assembly (140) for sensing the rotational speed of the closely axially spaced, independently rotatable exciter rotors, said drive axle assembly comprising a housing (26), a pinion gear (12), a ring gear (14) driven by the pinion gear, a differential carrier (30) fixed for rotation with the ring gear, a differential assembly (16) driven by the differential carrier including a first (46) and a second (48) differential side gears, first (20) and second (18) axle shafts rotatable with said first and second side gears, respectively, the differential assembly driving said side gears such that the rotational velocity of said differential carrier equals the average rotational velocity of said side gears, said first exciter rotor (116) rotatable about common rotational axes (24) with said ring gear and side gears and fixed for rotation with one of said side gears, said second exciter rotor (118) closely axially spaced to said first exciter rotor and rotatable about said common rotational axes, said second exciter rotor fixed for rotation with said ring gear, said first and second exciter rotors of substantially equal outer diameter, said drive axle characterized by;

said dual speed sensor comprising mounting means (150), a first (136) and second (138) pole piece assembly fixedly retained in said mounting means, each of said pole piece assemblies defining a longitudinal axes (166), said pole pieces fixed in said mounting means such that the longitudinal axes thereof are radial with respect to said common axes of rotation but are skewed relative to one another.

10. The pickup assembly of claim 9 wherein the longitudinal axes of said first and second pole pieces define and include an angle therebetween of about twelve degrees (12°) on a projection (FIG. 3) on a plane perpendicular of said axes of rotation.

11. The pickup assembly of claim 10 wherein said included angle is in the range of six degrees (6°) to eighteen degrees (18°).

12. The pickup assembly of claim 9 wherein said mounting means defines a substantially rectangular cross-section on a projection on a plane perpendicular to a line radial to said axes of rotation (FIG. 5C), said longitudinal axes lying substantially on planes parallel to a diagonal of said rectangular cross-section.

13. The pickup assembly of claim 9 wherein said mounting means includes a block of substantially non-conductive epoxy material in which said first and second pole pieces are potted.

14. The pickup assembly of claim 10 wherein said mounting means includes a block of substantially non-conductive epoxy material in which said first and second pole pieces are potted.

15. The drive axle assembly of claim 9 wherein each of said pole piece assemblies comprises a ferromagnetic pole piece (160), a permanent magnet (162) and a conductive coil (146) looped about said longitudinal axis (166).

16. The drive axle assembly of claim 10 wherein each of said pole piece assemblies comprises a ferromagnetic pole piece, a permanent magnet and a conductive coil looped about said longitudinal axis.

17. The drive axle assembly of claim 12 wherein each of said pole piece assemblies comprises a ferromagnetic pole piece, a permanent magnet and a conductive coil looped about said longitudinal axis.

* * * * *